(12) United States Patent
Navarro

(10) Patent No.: US 6,191,842 B1
(45) Date of Patent: Feb. 20, 2001

(54) COMPUTER ASSISTED CAMERA CONTROL SYSTEM

(75) Inventor: Alfredo Vallés Navarro, Barcelona (ES)

(73) Assignee: Service Vision, S.A, Barcelona (ES)

(*) Notice: Under 35 U.S.C. 154(b), the term of this patent shall be extended for 0 days.

(21) Appl. No.: 09/304,602

(22) Filed: May 3, 1999

Related U.S. Application Data

(63) Continuation of application No. 08/853,990, filed on May 9, 1997, now Pat. No. 5,900,925.

(51) Int. Cl.[7] .................................................. G03B 19/18
(52) U.S. Cl. ................................ 352/38; 352/53; 352/88; 352/243
(58) Field of Search .................................. 352/53, 44, 85, 352/87, 88, 243, 38; 396/419

(56) References Cited

U.S. PATENT DOCUMENTS

| 4,720,805 | 1/1988 | Vye ........................................ 364/525 |
| 4,959,798 | 9/1990 | Gordon et al. ......................... 364/513 |
| 5,900,925 | * 5/1999 | Navarro .................................. 352/53 |

* cited by examiner

Primary Examiner—Russell Adams
(74) Attorney, Agent, or Firm—K. David Crockett, Esq.; Crockett & Crockett

(57) ABSTRACT

A computer operated man assisted motion generation system for use with a camera in cinematography. The system responds to the measured or sensed position of a camera support such as a crane or dolly, and determines the desired camera pan, tilt, roll, focus, zoom, etc. based on predetermined correspondence between camera location and camera parameters, and generate movement of the camera and camera control accordingly.

1 Claim, 4 Drawing Sheets

COMPUTER ASSISTED CAMERA CONTROL SYSTEM

This application is a continuation of U.S. application Ser. No. 08/853,990 filed May 9, 1997, now U.S. Pat. No. 5,900,925.

FIELD OF THE INVENTION

This invention relates to systems and methods of motion control, particularly systems for the control of camera movement.

BACKGROUND OF THE INVENTION

There are currently two general systems for operating cameras during cinematography. The first and oldest system is a manual control of the camera and its support platform. Manual control of the camera is provided by a cameraman, and manual control of the support platform is provided by a grip. Before taping a scene, a director instructs actors to move about the set and speak, and perform specified actions. The director also ensures that the scenery, props, and lighting are placed on the set according to his instructions. The director also instructs a camera crew to film the action on the set during a take and capture the action and/or scenery from various viewpoints, with specified camera frames, and to follow the action with specified movements of the camera. The view point is defined by the relationship of the camera to the subject being filmed, and is determined by the location of the support platform and position of any booms or hoist mechanisms used to support the camera. The camera frames are defined by the relationship of the subject being filmed to the entire size of the scene filmed (closeup, portrait, group or landscape are terms that are sometimes used to describe various camera frames). The camera parameters include such things as the pan angle, the tilt angle, and the rotation angle (i.e., spatial attitude of the camera itself) and zoom, aperture, focus and focal length (i.e. lens system attributes). The action is set in motion and is filmed by camera crew, and during filming, the grip will move the support platform to hit the planned view points and the camera operator will adjust the camera parameters to obtain the desired frames follow the action with the specified movements (at the same time, the actors on the set will be moving, speaking and acting according to their own directions).

This is a highly interactive process, and the camera operator and grip must react to variances between the planned action and what actually goes on during each take, and variances between the actual action from take to take. In some situations, this method of filming becomes extremely difficult, and requires great experience and talent for the camera operator and the grip. For example, if the camera support platform is a crane with the camera supported on a remotely controlled camera head, the manual operation of the camera and lens parameters is best performed through remote control, from a remote control panel located at the base of the crane. The pan, tilt and rotation angles are operated by servo-motors at the remote head which adjust these parameters in response to operation of remote control hand wheels. Likewise, the lens system attributes (zoom, focus, etc.) are operated by servo-motors attached to the camera controls, and the servo-motors are operated by input devices on the remote control panel. The remote control panel may consist of a single control panel with controls for all parameters, or separate camera attitude control panel and camera lens system attribute control panel. A typical remote head has hand wheels for adjusting the camera pan, tilt, and rotation.

For a given live action scene, the director may desire viewpoints and camera frames which require large motions of the camera platform and fast motions of some or all of the camera parameters. The number and variety of combinations of such movement are limited only by the creativity of the cinematographer and director. The grip may be required to swing the boom of a camera crane quickly, while the camera operator may at the same time be required to quickly back-pan while slowly adjusting the camera tilt. Thus, for a single operator to adjust these parameters requires simultaneous adjustment and rotation of the hand wheels, but at varying speeds and directions for each hand wheel. This is quite difficult, akin to rubbing your tummy while patting your head, and maybe hopping up and down, where the patting occurs at one speed, the rubbing occurs at another speed, and the hopping occurs at yet another speed.

Another way to film a scene is through the use of computer operated motion control systems. These systems are ideal for reproducing exactly the same camera movement over and over again, which is desirable in special effects creation. The ability to film the exact same sequence, over and over again, helps cinematographers and producers produce special effects in which many images are layered on top of each other. Examples of the special effects created with motion control systems are the various space battle scenes in which numerous spaceships fly about on diverse flight paths while the camera follows one of the space ships. This type of special effect is created by filming a first scene in which the model central ship flies through a model stage while the camera follows the ship as desired. After this first scene is filmed, another scene is taped in which a model second ship flies through the model stage, and it is filmed by the camera while the camera proceeds along the exact same pathway to capture this second scene. The two films are then layered together to make a single film showing both ships together. Any number of ships may be added to the scene by taping additional ships while the camera repeats its path exactly for every take. In order for the movement of the various ships to appear responsive to each other, and to permit accurate overlays, the different films must be synchronized. Battle scenes such as the spectacular Star Wars dog fight between Luke Skywalker and Darth Vader in the trench of the Death Star were created using this type of system.

Typical motion control systems, such as those used by Industrial Light and Magic, and those produced by Mark Roberts Motion Control or Christopher Nibley Cinematographers, control every parameter of both the crane and camera operation. The movement of the crane along a track, the speed of the crane movement, the boom tilt, boom extension and crane rotation, as well as camera pan, tilt, rotation, zoom, aperture and focal length are all controlled by the computer. In these systems, a key frame method may be used to establish the several points along the desired path of the crane and camera. The crane is moved to a number of key positions, the camera attitude adjusted to a number of corresponding key attitudes, and the camera controls adjusted to obtain a key frame defined by the camera parameters. These key frames are selected by the director, and the key frame is defined by certain predetermined field of view, focal length, focus and orientation of the scene on the film. This key frame corresponds to the zoom, camera attitude, and camera position and crane position used to view the key frame. In the key frame motion control system, the system memorizes all the parameters of the key frame, and receives input from the system operator on the desired predetermined time to hit each key frame. When the system is instructed to start a take, it moves the camera to the key frames at the predetermined times. The camera may interpolate movement between the key frames to ensure a smooth trajectory of the camera between key frames. The key frames are hit at the same time in every take, and we refer this as a synchronized system because the key frames and all other frames are strictly tied to a master clock to ensure that the camera movement proceed not only through the same points, but also at the same pace, on every take.

These motion control systems completely eliminate operator input during the take. The advantage of this system is that it can repeat complicated camera movements very precisely, and many times over, with no deviation in the movement of the camera from one take to the next. On the other hand, the system does not permit modification of the camera movement during the take, because it is not intended for use in live action where it is desirable to modify the camera movement from the predetermined camera movement during the take.

For filming of many live action scenes, manual manipulation of the camera is exceedingly difficult. The artistically desired pace and movement of the camera between viewpoints may require extremely rapid manipulation of the camera controls. While a talented cameraman may be able get the shot, the need to film several takes of the same scene due to limitations in the camera operator's work, the grips work, the actors' performance and the motion of other subjects such as vehicles and animals increases the workload, and a system that provides assistance to the cameraman facilitates production. Use of a motion control system as described above is not a feasible solution, because the camera movement and operation is fixed by the system and cannot be altered to account for variations in the performance as a cameraman can.

SUMMARY

The system described below is a responsive motion generation system which provides for computer assisted camera operation and, conversely, operator assisted computerized camera control. The system operates parts of the camera system with computer controlled motors and encoders, and allows or requires the grip to move the camera support about a set while the computer system adjusts camera parameters in accordance with memorized key points. The grip may move the camera support about the set, and adjust the camera position on the camera support, at whatever pace is required by the actions taking place on the set. The computer system will adjust camera parameters automatically to match predetermined parameters for various positions of the camera. In this manner, the camera will perform complex and rapid adjustments of pan, tilt, roll, focus, aperture and zoom to capture camera frames matching the predetermined frames, regardless of the timing of movement of the camera support.

To account for the fact that the scene being filmed will vary with each take, and for the fact that the grip may vary movement of the camera support, the system provides a means for the camera operator to assist the computer by making fine adjustments to the camera parameters. With real time input, the camera operator may partially override or add to the automatic controls with fine adjustment of camera parameters. For example, when the computer system is directing the camera to a predetermined frame, the actors and props may be out of the frame, or slightly off center, and may be spread farther apart than planned. In this case, the camera operator may make fine adjustments to the pan angle to bring the action to the center of the frame, and may adjust the zoom slightly to pull back from the action to get the entire desired frame on camera.

Thus, one or more parameters of the crane support are assigned the role of master axes, and all computer controlled parameters behave as slave axes. The slave axes are adjusted by the computer control system in response to sensed changes in the position of master axis, and may be fine adjusted during a take by the camera operator through a fine adjust control box.

DETAILED DESCRIPTION OF THE INVENTION

Figure 1:
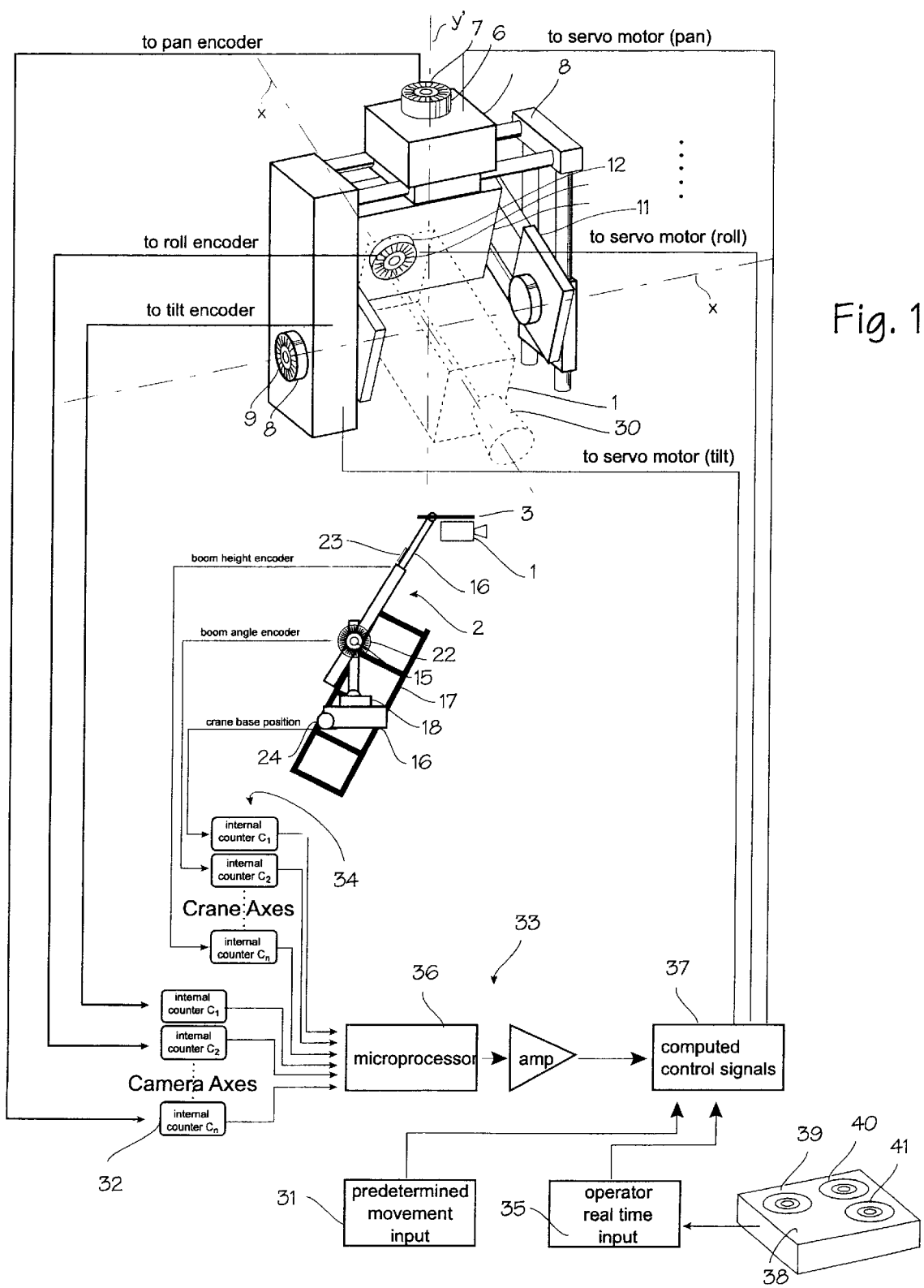
FIG. 1 is an overview of the motion generation system

FIG. 1 is an schematic overview of the system. The system operates to control camera 1 (shown in phantom) which is mounted on a camera support 2. The camera support may be any type of holding device, including a crane, boom arm, dolly, camera car, pedestal, or any other machine (including a person) used for moving the camera during filming, but for illustration we show a crane used as the camera support. The crane 2 includes a camera platform 3 with a remote head 4 which includes one or more rotating shafts or gimbals for turning the camera about several axes. The pan shaft 6 is a vertical shaft used as the axis for panning the camera from left to right about the pan axis (usually the vertical axis when the camera is level). The tilt gimble 8 provides for tilting the camera up and down about tilt shaft 9, and the roll gimble 11 provides for rotating the camera about the rotation shaft 12. Thus the shafts coincide with the three axes of camera movement, namely the pan, tilt and rotation axes, where the pan axis is a vertical axis, the tilt axis is the horizontal axis perpendicular to the line of sight of the camera, and the rotation axis is the horizontal axis parallel and coincident with the line of sight of the camera. In graphical terms, these axis would correspond to the x', y' and z' axes.

The entirety of all these components of the camera platform is referred to as the remote head 4, and this remote head is mounted on the camera platform 3 atop the crane 2. The crane 2 includes a boom 14 and a crane pivot 15 mounted on the crane base 16. The crane may have wheels or other means for movement along a track 17, or it may be stationary or free moving, and the track may be laid upon the floor or ground or mounted in a ceiling or wall of a studio. The boom may be of fixed length, or it may be an extendable boom. The crane provides a crane tilt pivot 15 for raising and lowering the boom, and a crane rotation or swing turntable 18 for swinging the boom 14 around the crane base 16. Thus the various parts of the crane coincide with various crane axes such as boom tilt, boom extension, boom rotation, base location. All these parameters define the location of the camera, which in graphical terms would be defined as the position along the x, y and z planes.

The system must know where the camera is in order to determine where the camera should be pointing and where it should be focused. Additionally, the system should know the position of all camera parameters to aid in determining appropriate control signals that must be sent to the camera control servo-motors to cause the desired movement. To inform the computer system as to the position of all the crane and camera axes, various position sensors are installed on the crane and the camera. Sensing of rotational movement is best performed by shaft encoders which are commercially available in wide variety. A pan encoder 7 is operably connected to the pan shaft 6, a tilt encoder 10 is operably connected to the tilt shaft 9, and a roll encoder 13 is operably connected to the roll shaft 12. We say "operably connected" to include the wide variety of mechanisms which allow sensing of the position of the shafts, and these may include laser encoders, magnetic encoders, or inductance encoders, all of which sense the position of the shaft through electro-magnetic connections to the shafts (no physical contact is necessary), or they may include servo-sensors where a physical part is actually in physical contact with the shaft of the camera. Additionally, a focus mechanism encoder, aperture mechanism encoder, and zoom encoder, are installed on the camera controls, and each of these encoders is likewise operably connected to the appropriate camera control mechanism in any manner which provides for sensing of the position of these controls. Similar position sensing mechanisms are installed on the crane, including the crane tilt encoder 22 which senses the tile angle of the crane, the boom extension encoder 23 which senses the extension of the boom, and the crane base position sensor 24 which senses the location of the crane along the track 17.

All of the parameters which are described above may be measured on a continuous basis and monitored by the computer control system. Multiplexing of signals at the remote head, at the computer input, or other appropriate place in the system may be employed. Some or all of the parameters may be controlled by the computer control system, and some or all of the parameters may be fine adjusted by an operator during a take. The number of parameters subject to computerized monitoring, computerized control, and operator override may vary depending on the artistic goals to be achieved with the system. In an exemplary embodiment, the camera parameters are monitored and controlled by the computer, while the crane parameters are monitored by the system and used as the inputs from which the computer control system determines the desired camera parameters. These parameters, including the camera position parameters, camera attitude parameter, and lens system attributes, are often referred to as camera axes.

Figure 2:
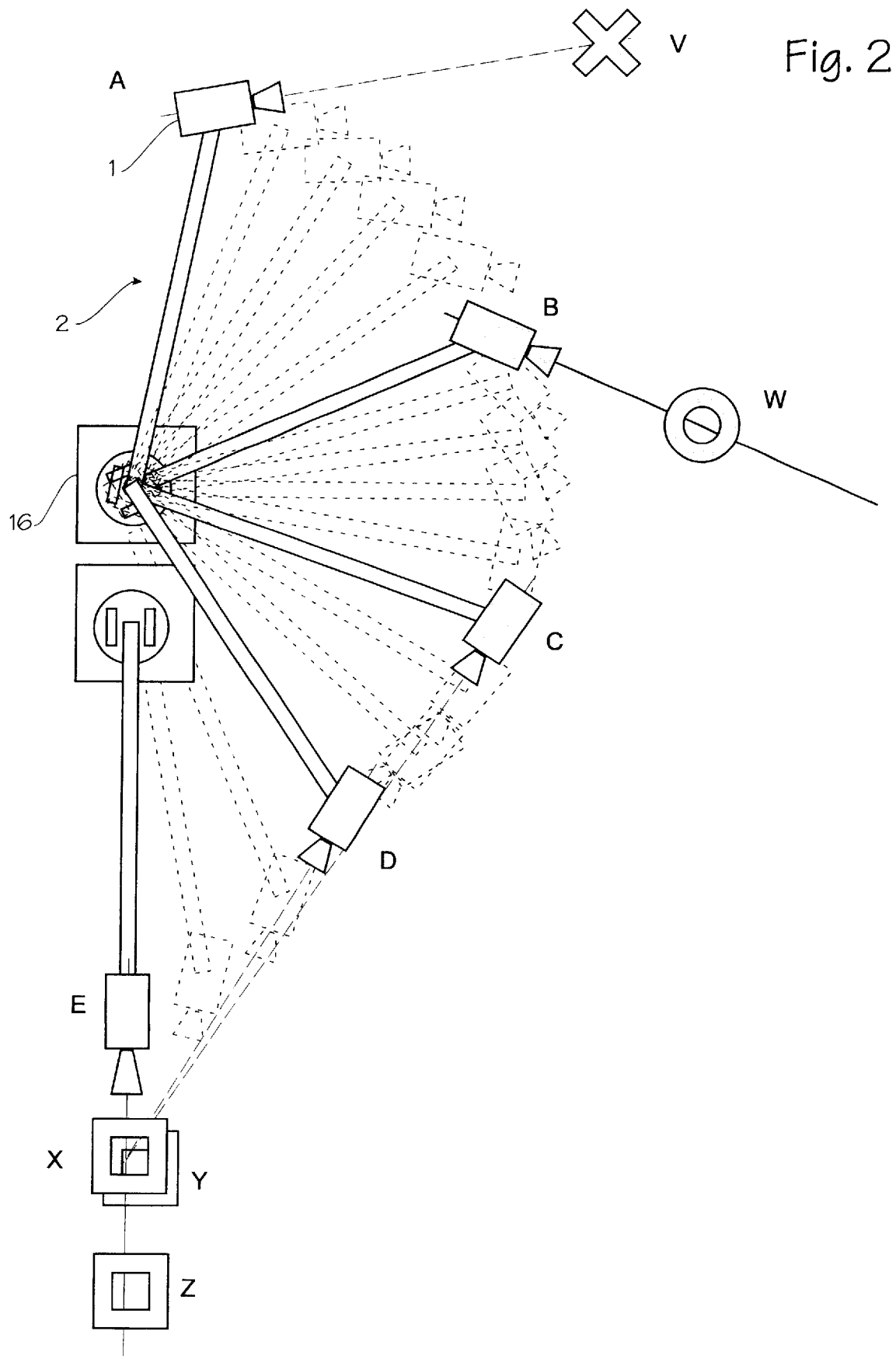
FIG. 2 is a diagram illustrating the initial setup of the system.

FIG. 2 is a schematic illustration of the steps used to set up the system to film a take. The crane 2 is used in conjunction with the remote head 4 and the camera 1 on a set to film various subjects V, W, X, Y and Z. The subjects may be distinct subjects, or they may be the same subject moving about the set, in which case the V, W, X, Y and Z will denote key positions of the subject (an actor, a car, a plane, for example) at various times and places in the predetermined staging of the scene to be filmed during a take. The intended movement of the crane and camera is shown in positions A, B, C, D and E. The positions A, B, C, D and E are key viewpoints in the predetermined filming desired to capture the action of the subject. With these key positions and key viewpoints in mind, the camera is manipulated by the grip to each of the positions A, B, C, D and E, and the camera parameters are adjusted to obtain a camera frame in which the subject appears in the camera (as viewed through the lens or through a monitor) as desired by the director. Thus, the desired zoom, focus and aperture are set as desired at each of positions A, B, C, D and E, thus providing a series of predetermined camera frames. The crane position and camera parameters are measured and recorded by the computer system at each position. Thus the computer system is supplied with coordinates of the crane, remote head and the camera parameters corresponding to the A, B, C, D and E viewpoints (which in turn correspond to the V, W, X, Y and Z positions). Note that at key position Z, where the subject has moved away from the camera after being in key position Y, that the camera lens 30 has been zoomed at viewpoint E to cause a follow focus on the subject as it moves away from the camera. The system will permit input of the follow focus action, and any other camera parameter adjustment, as a camera frame or pre-recorded camera manipulation. The information obtained in the camera frame recording procedure is stored as predetermined movement input in suitable computer memory 31, such as a hard drive or RAM.

Once all these positions have been recorded, the system is ready to operate the camera and remote head during a take. During the take, the subject moves according to the staging directions, from position V to position W to position X, and so on. The grip moves the crane to follow the subject, and, as illustrated in FIG. 2, the grip moves the crane to viewpoint A when the actor is in position V, to viewpoint B when the actor is in position W, to viewpoint X when the subject is in position C, and so on. While the grip moves the crane and camera to the various viewpoints, the computer control system senses the position of the crane and camera and adjusts the camera parameters as necessary to match the prerecorded camera parameters. For movements between successive viewpoints, and all the necessary changes in the crane axes, the movement generator generates a movement of the remote head and camera controls by interpolating in relation to each of the crane axes the coordinates of the remote head axes corresponding to the A, B, C, D, and E viewpoints. When the crane is moved from viewpoint A to viewpoint B the computer system generates movement of the remote head so that the camera will be pointed at Position W when the movement to viewpoint B is complete. The required movement at all points between viewpoints A and B is determined by the system by interpolating between the predetermined positions of the camera parameters at viewpoints A and B. Each successive movement to the remaining key positions X, Y and Z are accomplished in the same manner, with the grip moving the camera crane into position at the pace required to follow the subjects during a take, and the system manipulating the camera controls and remote head position so that the remote head smoothly moves from key position to key position during the take. When the remote head and camera stop at key viewpoint Z, the follow focus may be instituted as a replay or interpolation by the computer system, and proceed automatically. With the operator override function, the follow focus can be adjusted (slowed or accelerated) to account for variation in the expected movement of the subject between key positions Y and Z. FIG. 2 thus illustrates the ideal operation of the system wherein the subjects and the grip perform in the predetermined manner without substantial deviation from the key positions and key viewpoints, and the system is permitted to automatically generate movement of the remote head in response to the movement of the crane. The system treats selected axes such as boom angle, boom length and track position as master axes, and based on these axes the system treats selected axes such as the camera pan angle, tilt angle, rotation angle, zoom focus and aperture as slave axes. The movements of the slave axes are dictated by the system in response to the position of the master axes.

The computer system receives position input from the various encoders. The information from the boom height encoder 23, the boom angle 22 encoder and the crane base position encoder 24 is transmitted to position counters 32 and is interpreted by the computer system 33 to calculate the physical position of the camera. The computer compares this information to the key positions and the interpolations derived from those key positions, and determines where the camera head should be pointed and how the camera controls should be adjusted to obtain the attitude needed to match the predetermined camera path. In the example chosen to illustrate the system, these crane axes are not controlled by the computer, but are controlled by the grip while the computer generates the movement of the camera head responsive to the position, height and angle of the crane. These axes may be thought of as master axes, as their position dictates the position of the other axes in the system through the computer control system.

The computer also receives position information from the camera parameter encoders, including the tilt encoder 10, the pan encoder 7, and the roll encoder 13, and the focus mechanism encoder 19, aperture mechanism encoder 20, and zoom encoder 21. The computer uses the position information from these encoders, processed through camera parameter counters 34, to ensure that the camera remote head and camera controls have actually moved to the positions dictated by the computer control system. The computer compares the position of each of the camera parameters to the desired position (as determined by the key viewpoints and the interpolations, and the operator override signals), and computes control signals and transmits these signals to the various servo-motors. The servo-motors then move the camera parameters as directed by the computer control system. The camera axes, including pan, tilt, roll, focus, zoom and aperture may be thought of a slave axes, as there position is determined responsive to the master axes, and their movement follows the movement of the master axes.

The various microprocessing components, signal processing components, comparators, and amplifiers are provided as necessary, but the particulars of the various components will vary with the microprocessor chosen to implement the system and the servo-motors and encoders used to implement the system. In general, the system will require camera position counters 32, camera parameter counters 34, a memory 31 for storage of predetermined key position, key viewpoint, and camera frame information, a manual signal input transmitter 35, computer 33 with a suitable microprocessor 36 and software storage media and associated and a signal generating and transmitting means 37.

Figure 3:
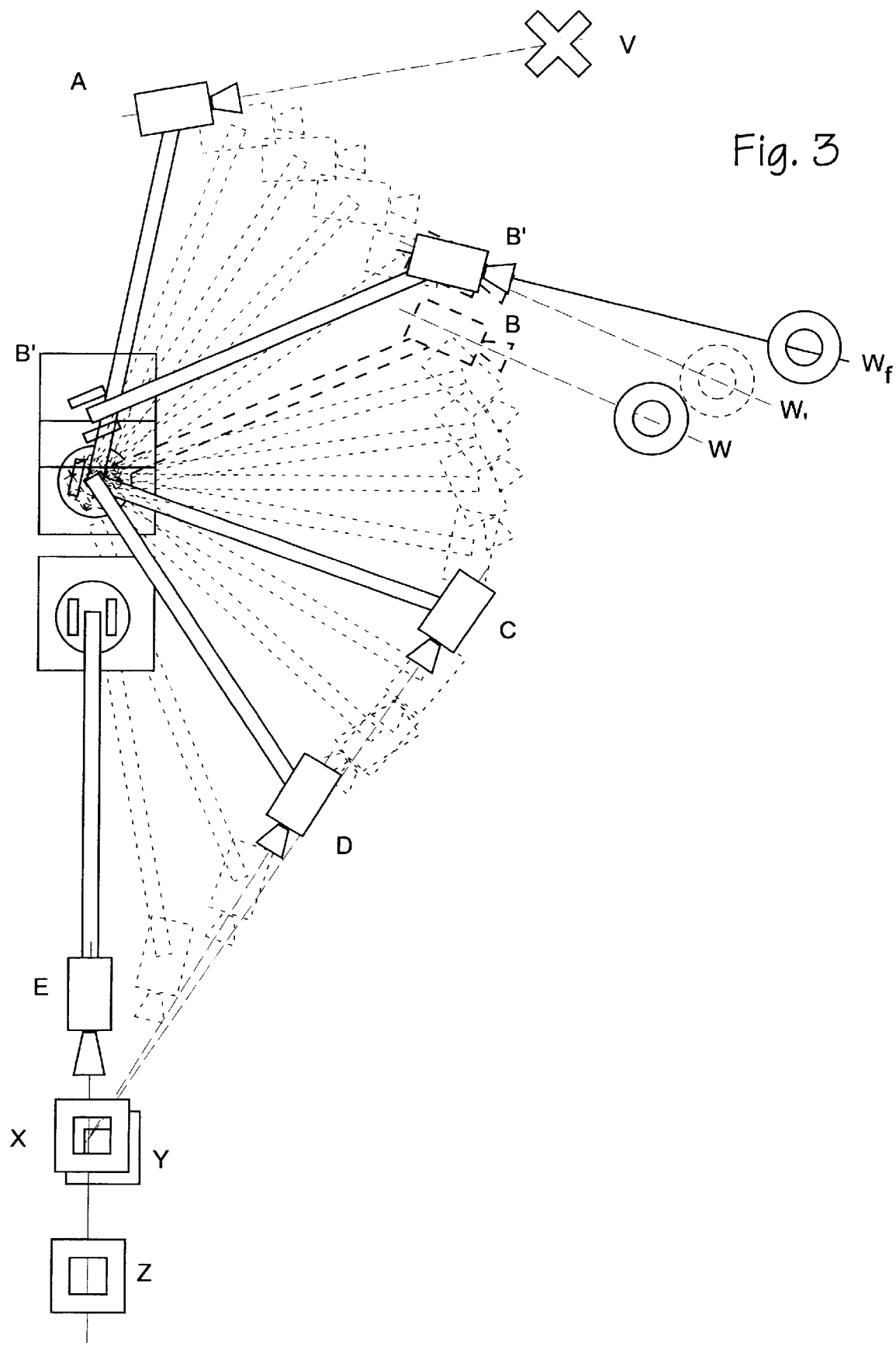
FIG. 3 is a diagram illustrating the operation of the system.

FIG. 3 is a diagram illustrating the operation of the system. In addition to the computer control of the camera remote head and camera parameters, the system allows one or more of the computer driven parameters to be subject to an operator in-putted fine adjustment during a take. A camera operator may view the scene that is being filmed through a monitor located at the base of the crane or elsewhere. As the scene unfolds on the set, the grip will move the crane and boom to follow the action. The grips movement of the crane and boom will vary from take to take, as necessary to follow the action on the set which will vary from take to take. The action on the set will vary from the predetermined staging, and will also vary from take to take. Thus, the frame captured on film by the camera will vary from the desired framing. For example, as illustrated in FIG. 3, during the take, the subject may wander from the intended staging, and miss a mark W (instead moving to unplanned position W') or the grip may be slightly off the predetermined viewpoint B (instead moving the crane to unplanned viewpoint B'). In this case, both the computer control system and the operator override subsystem cooperate to provide a good take. The computer control system interprets the actual crane position and compares this with the key viewpoints, and calculates an interpolated position conforming the most desirable intermediate positions for crane and camera parameters. Thus, although the grip has missed his mark in moving to viewpoint B, the computer control system senses that the crane is very near position B, and directs the camera to point to interpolated position $W_i$, which is an interpolated point between position between A and B. The operator fine adjust control box 38 (FIG. 1) may be used by the camera operator to adjust the camera controls to obtain the frame desired by the director, pointing the camera to position $W_f$. The control box provides hand wheels 39, 40, and 41 which provide additional input for the camera pan, tilt and roll. Additional controls for operator fine adjust of camera focus, zoom and aperture may also be provided. These signals are provided to the computer system 33, where they are processed and added into the computer generated motion control signals. The result is that the camera receives a control signal which corresponds to the gross control signal and the fine adjust signal, and moves the camera controls to achieve the shot desired by the camera operator. Thus, while the computer control system has automatically manipulated the remote head to follow the subject during potentially large motions of the crane and boom, the camera operator manipulates the fine adjustments to obtain an artistically desirable picture which best conforms to the instructions of the director. In the case illustrated in FIG. 3, the camera operator, seeing that the camera is farther away from the subject than intended when the subject moves from point V to point W', instead of point W as intended, and that the subject is off center in the monitor, will fine adjust the zoom and pan slightly to tighten up the frame and bring the subject into the center of the frame. To accomplish this operator fine adjust while at the same time relying on computer control signals to accomplish gross control of the camera, the overall system illustrated in FIG. 1 includes the operator override control box 38 with a pan hand wheel 39, a tilt hand wheel 40, and a roll hand wheel 41.

The system in additive in the sense that cruise control on an automobile is additive. When the driver of a car sets the cruise control function, the car automatically maintains the cars speed. Thus speed would be a predetermined parameter. If the driver wants to go a bit faster, he may press the gas pedal and go a fast as he wants. This is analogous to the operator fine adjust. When the car driver wants to release speed control back to the cruise control signal, he lets up on the gas pedal and the cruise control resumes. In a sense, the car has added the drivers fine adjust to the predetermined throttle position to provide the speed required by the driver. Note that the cancel function (activated by braking) of cruise control removes the predetermined signal altogether, and provides complete manual control of speed, and that the resume function causes the cruise control system to take over and bring the car back up to the predetermined speed. Similar cancel functions may be included in camera control system. Thus manual input during automatic operation of the camera parameters may be implemented as an additive control signal which must be combined with the predetermined position control signals, or as a complete displacement of the predetermined position control signals in favor of the manual input.

Figure 4:
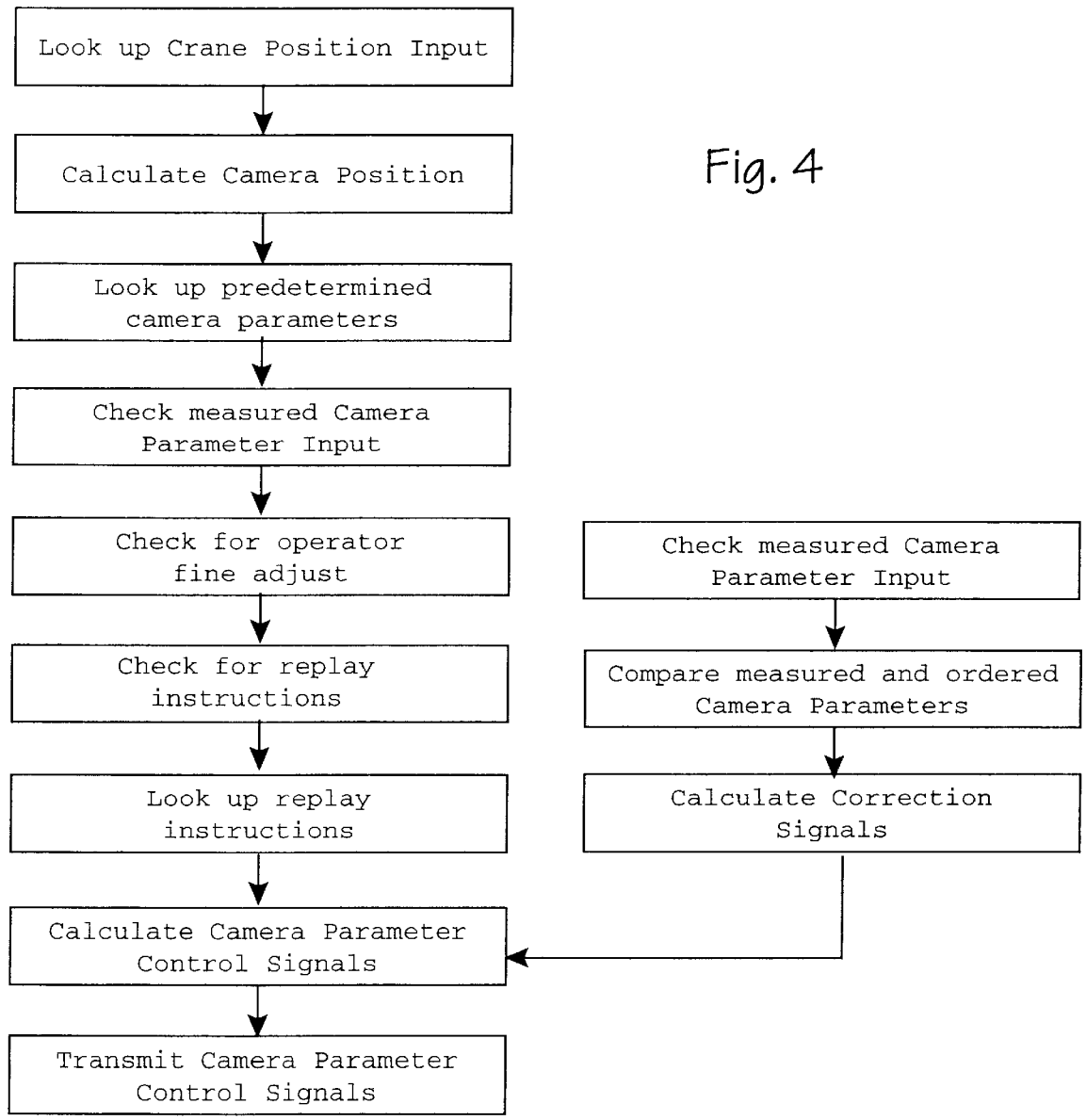
FIG. 4 is block diagram of the software which is used control the system

FIG. 4 shows a block diagram of the software system used to implement the system. First, the system must have the capability of determining, measuring and storing where the camera is in order to determine where the camera should be pointing and where it should be focused. This is performed by the Read Crane Position function, which first reads inputs from the crane encoders, including the crane tilt encoder, the boom extension encoder and the crane base position encoder. These encoder inputs are then stored in the appropriate table in memory. Additionally, the system must know the position of all of the camera parameters. This is done by the Read Camera Parameters function, which first reads inputs from the camera parameter encoders, including the encoders for the spacial attitude of the camera itself (the pan encoder, tilt encoder, and roll encoder) as well as the encoders for the lens system attributes (the zoom encoder, aperture mechanism encoder, focus mechanism encoder and focal length encoder). These encoder inputs are then stored in the appropriate table in memory. Both of these functions measure the encoders on a continuous basis and update the tables stored in memory accordingly.

Next, the system must store the key viewpoints created by the director in a predetermined filming take. As illustrated previously, the camera is manipulated by the grip to each of the viewpoints A, B, C, D and E. At each viewpoint, the system measures the encoders to determine the crane position and camera parameters at each viewpoint and stores that information in a table. The system uses the Read Crane Position function and the Read Camera Parameters function and stores the data in a table called the Predetermined Position Data table. This table is a nested table where the crane position is on the x axis and the camera parameters position is on the y axis. Naturally, the crane position is an aggregate of the 3 elements and the camera position is an aggregate of the 7 elements (the 3 spacial as well as the 4 lens attributes). It acts like nested tables where the main table cross references to other tables. Thus, the computer system is supplied with coordinates of the crane and camera parameters corresponding to the A, B, C, D and E viewpoints which in turn correspond to the V, W, X, Y, and Z positions. This data will form the basis for comparison in the future.

In the actual take, the software compares the actual movements of the grip moving the crane, and compares the actual position with the predetermined corresponding camera viewpoints and automatically moves the camera to the predetermined position. This is performed by the Check Measured Camera Parameter Input function. For example, as the grip moves the crane from position A to B, this function moves the camera according to the predetermined camera position to track the subject moving from V to W. The function uses a feed back loop or an iterative function, where the actual crane position is continually measured by the Read Crane Position function, compared to the Predetermined Position Data table, and the camera subsequently moved until the Predetermined Position Data matches the actual crane position. The Check Measured Camera Parameter Input function correspondingly moves the camera's servo-motors to match the camera parameter values stored in the Predetermined Position Data table.

To incorporate the operator fine adjust feature, the software performs a Check For Operator Fine Adjust Function, which identifies when the cameraman has adjusted the camera differently from what was predetermined. Here, since the encoders are constantly monitored by the Read Camera Parameter function, this routine identifies where the operator has moved the camera and sets a flag which tells the software to ignore the Predetermined Position Data table for the camera position and instead use position that results from the predetermined position in combination with adjusted position achieved by the manual input by the operator. For example, where the subject has missed a mark W by moving instead to W', the software reads the operators fine adjust parameters stored by the fine adjust function and uses this data in the calculation.

Several features may be incorporated into the system. A complete operator override feature can permit the camera operator to take complete control of the system during a take. When this feature is activated, the camera movement is on manual from that point on until the system is reset by the cameraman. Override may be applied to all camera parameters or to individual parameters. Automatic replay of complex predetermined camera movements can be stored in memory and initiated by the camera operator when desired during the take. Routines may be built in to handle aberrant behavior on the part of the grip, for example, where the grip moves the crane far off the pathway defined by the A, B, C, D, and E positions. It should be noted that the software described above will implement the inventions, but that the actual software code used to implement the invention by particular users of the invention may arrange the subroutines differently, and provide input and analyze input in different order than described above. Variations in code will be expected according to the preferences of the computer programmers implementing the system.

While the preferred embodiments of the system and method for controlling a camera to assist camera operators in live action cinematography have been described in reference to the environment in which they were developed, they are merely illustrative of the principles of the inventions. While the invention has been illustrated as implemented with a crane, the crane is merely one of many suitable camera supports, and may be replaced with camera dollies, overhead motion tracks, camera cars and even airplanes and aerial drones. Other embodiments and configurations may be devised, and the inventions may be applied in other cinematography methods without departing from the spirit of the inventions and the scope of the appended claims.

I claim:

1. A method of filming a scene with a subject within the scene, said method comprising:

providing a system for controlling the operation of a camera in response to the position of the camera, where the camera has one or more adjustable camera parameters such as pan, tilt, roll, focus, or aperture, said system comprising;

means for determining the position of the camera;

means for adjusting one or more camera parameters in response to the position of the camera;

computer storage for storing data regarding a plurality of key viewpoints of the camera and key frames corresponding to each key viewpoint, said key frames comprising predetermined values of camera parameters;

a computer control for controlling the adjusting means to adjust the camera parameters when the camera is moved to a particular key viewpoint to match the predetermined camera parameter values of the key frame corresponding to the particular key viewpoint;

said computer control being programmed to adjust camera parameter values when the camera position is between two successive key viewpoints, based on an interpolation of the predetermined camera parameter values of the key frames corresponding the successive key viewpoints;

storing data regarding key viewpoints within the scene and the corresponding key frames in the computer storage;

moving the camera along successive key viewpoints in response to movement of the subject within the scene; and operating the computer control to adjust the camera parameters when the camera is moved to a particular key viewpoint to match the predetermined camera parameter values of the key frame corresponding to the particular key viewpoint;

permitting the camera to be moved to a location different that the particular key viewpoint to account for variation in the movement of the subject, and operating the computer control to adjust the camera parameter values based on an interpolation of the predetermined camera parameter values of the key frames corresponding the particular key viewpoint from which the camera movement has deviated.

* * * * *